United States Patent
Sebright et al.

(10) Patent No.: US 10,322,758 B2
(45) Date of Patent: Jun. 18, 2019

(54) TRACK LINK WITH ANGLED SEAL COUNTERBORE

(71) Applicant: Caterpillar Inc., Peoria, IL (US)

(72) Inventors: Jason L. Sebright, Chillicothe, IL (US); Eric James Johannsen, Washington, IL (US)

(73) Assignee: Caterpillar Inc., Deerfield, IL (US)

( * ) Notice: Subject to any disclaimer, the term of this patent is extended or adjusted under 35 U.S.C. 154(b) by 150 days.

(21) Appl. No.: 15/488,710

(22) Filed: Apr. 17, 2017

(65) Prior Publication Data

US 2018/0297653 A1   Oct. 18, 2018

(51) Int. Cl.
*B62D 55/088* (2006.01)
*B62D 55/21* (2006.01)
*B62D 55/28* (2006.01)

(52) U.S. Cl.
CPC ......... *B62D 55/0887* (2013.01); *B62D 55/21* (2013.01); *B62D 55/28* (2013.01); *B62D 55/213* (2013.01)

(58) Field of Classification Search
CPC .... B62D 55/0887; B62D 55/21; B62D 55/28; B62D 55/213
USPC .......................... 305/102, 103, 104, 105, 106
See application file for complete search history.

(56) References Cited

U.S. PATENT DOCUMENTS

| | | | |
|---|---|---|---|
| 8,985,590 B2* | 3/2015 | Liang .................. | B62D 55/211 277/549 |
| 2003/0141760 A1* | 7/2003 | Yamamoto .......... | B62D 55/211 305/185 |
| 2012/0153715 A1* | 6/2012 | Tsubaki ............... | B62D 55/092 305/186 |
| 2015/0197293 A1* | 7/2015 | Diekevers .......... | B62D 55/0887 305/100 |
| 2016/0068204 A1* | 3/2016 | Rathod ............. | B62D 55/0887 277/352 |

* cited by examiner

*Primary Examiner* — S. Joseph Morano
*Assistant Examiner* — Jean W Charleston
(74) *Attorney, Agent, or Firm* — Law Office of Kurt J. Fugman LLC

(57) ABSTRACT

A track link comprises a body defining a top surface, a bottom surface, a first side surface and a second side surface, a proximate end and a distal end, a first bore adjacent the distal end defining a first longitudinal axis and a second bore adjacent the proximate end defining a second longitudinal axis; wherein either the first bore or the second bore is a blind bore, forming a counterbore configured to house a seal assembly and the counterbore defines a wall that forms an angle with the longitudinal axis of the bore that is greater than zero degrees.

4 Claims, 5 Drawing Sheets

TRACK LINK WITH ANGLED SEAL COUNTERBORE

TECHNICAL FIELD

The present disclosure relates to seal counterbores used to house a seal assembly that prevents the loss of lubrication from a pin join in a track chain assembly of an endless undercarriage drive employed by earth moving, construction and mining equipment and the like. Specifically, the present disclosure relates to a track link with an angled seal counterbore.

BACKGROUND

Earth moving, construction and mining equipment and the like work are often used in rough, off-road terrain. These machines often employ an endless drive with track shoes that is better able to propel the machines in such environments over obstacles and uneven terrain, etc. The track chains, which include shoes, are held together by a series of interconnected track links, pins and bushings that are supported on the drive sprocket, idler and support rollers of the machine. As can be imagined, lubrication is necessary to ease the movement of a pin or bushing relative to each other or to one or more track links so that the articulated joints of the track chain may move, allowing the needed flexibility for the track chain to move about the undercarriage or conform to the terrain.

Seal assemblies are provided to prevent the loss this lubrication. However, such seal assemblies need to be installed and protected by the structure that surrounds or houses them. For example, it is undesirable for the seal assemblies to be heavily loaded or "packed" as this could lead to damage of the seal assembly, leading to a leakage of the lubricant. Also, installing the seal assemblies can be difficult without causing some damage to the seal assemblies.

In many applications, the structure for housing the seal is in a track link that is part of the larger track chain assembly. Assembling the track chain assembly without pinching or otherwise deforming to an undesirable extent the seal assembly may be difficult. Therefore, a way to install a seal assembly in such a track chain assembly, and more particularly, in a track link is needed.

SUMMARY

A track link according to an embodiment of the present disclosure comprises a body defining a top surface, a bottom surface, a first side surface and a second side surface defining a thickness therebetween, a proximate end and a distal end, and the body also defines a first bore adjacent the distal end defining a first longitudinal axis and a second bore adjacent the proximate end defining a second longitudinal axis. Either the first bore or the second bore is a blind bore, forming a counterbore configured to house a seal assembly and the counterbore defines a wall that forms an angle with the longitudinal axis of the bore that is greater than zero degrees.

A track link subassembly according to an embodiment of the present disclosure comprises a body defining a top surface, a bottom surface, a first side surface and a second side surface defining a thickness therebetween, a proximate end and a distal end. The body defines a first bore adjacent the distal end and a second bore adjacent to the proximate end, and the first bore defines a first longitudinal axis and the second bore defines a second longitudinal axis. The body also defines a first aperture disposed between the first bore and the second bore, the first aperture being disposed nearer the first bore than the second bore. Similarly, the body defines a second aperture disposed between the first aperture and the second bore and includes a first strut disposed between the first aperture and the second aperture. The body jogs along a direction parallel with either the first or second longitudinal axis and such that the first bore is offset from the second bore along a direction parallel with either the first or second longitudinal axis, and the first bore is a blind bore and the second bore is a thu-bore. The first bore forms a counterbore configured to house a seal assembly and the counterbore defines a wall that forms an angle with the longitudinal axis of the bore that is greater than three degrees but less than seven degrees.

A track chain assembly according to an embodiment of the present disclosure comprises a plurality of track pins and track bushings disposed about the track pins, and a plurality of track links that are connected to each other by either a track pin or a track bushing, wherein at least one track link defines a plurality of apertures for receiving a track pin or bushing. A plurality of track fasteners may be provided to attach a plurality of track shoes to the track links via the track fasteners. At least one track link includes a body defining a top surface, a bottom surface, a first side surface and a second side surface defining a thickness therebetween, a proximate end and a distal end. The body also defines a first cylindrical bore adjacent the distal end and a second cylindrical bore adjacent to the proximate end, and a first aperture disposed between the first bore and the second bore, the first aperture being disposed nearer the first bore than the second bore. The body further defines a second aperture disposed between the first aperture and the second bore, and the body includes a first strut disposed between the first aperture and the second aperture. The first bore defines a first longitudinal axis and the second bore defines a second longitudinal axis and the body jogs, forming an offset track link such that the first bore and second bore are offset from each other along either the first or second longitudinal axis. The first bore defines a first diameter, the second bore defines a second diameter, and the first diameter is greater than the second diameter while the first bore is a blind bore and the second bore is a thru bore. The first bore forms a counterbore configured to house a seal assembly and the counterbore defines a bottom wall and a sidewall that forms an angle with the longitudinal axis of the bore that is greater than three degrees but less than seven degrees.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
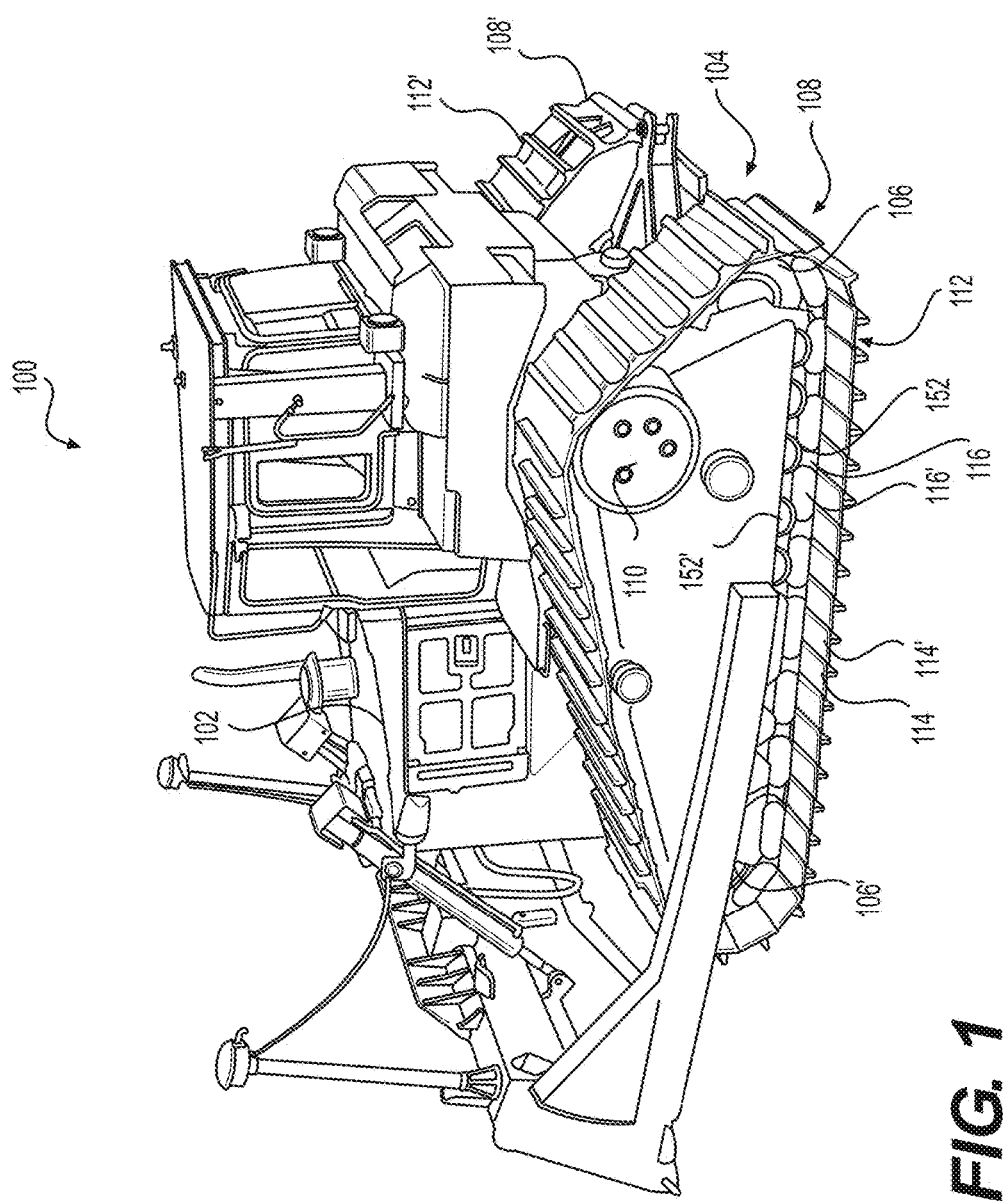
FIG. 1 is a perspective view of a machine that may use various track chain assemblies with an angled seal counterbore according to various embodiments of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

Various embodiments of an apparatus and a method for creating a track chain assembly using a track link with an angled seal counterbore will now be described. In some embodiments, the track link is an offset link that may be used with track chain assemblies already in the field.

FIG. 1 illustrates an exemplary machine 100 having multiple systems and components that cooperate to accomplish a task. Machine 100 may embody a mobile machine that performs some type of operation associated with an industry such as mining, construction, farming, transportation, or any other industry known in the art. For example, machine 100 may be an earth moving machine such as an excavator, a dozer, a loader, a backhoe, a motor grader, or any other earth moving machine. Machine 100 may include a power source 102 and an undercarriage assembly 104, which may be driven by power source 102 and supported by one or more spaced-apart idler wheels 106.

Power source 102 may drive undercarriage assembly 104 of machine 100 at a range of output speeds and torques. Power source 102 may be an engine such as, for example, a diesel engine, a gasoline engine, a gaseous fuel-powered engine, or any other suitable engine. Power source 102 may also be a non-combustion source of power such as, for example, a fuel cell, a power storage device, or any other source of power known in the art.

Undercarriage assembly 104 may include two separate continuous tracks 108, one on either side of machine 100. Each track 108 may be driven by power source 102 via one or more drive sprockets 110. In addition, each track 108 may include a chain 112 and a plurality of track shoes 114, each configured to selectively engage a surface, e.g., the ground. Each chain 112 may include a plurality of link subassemblies 116. Support rollers 152 are also provided at the bottom of the track to support the chain.

Figure 2:
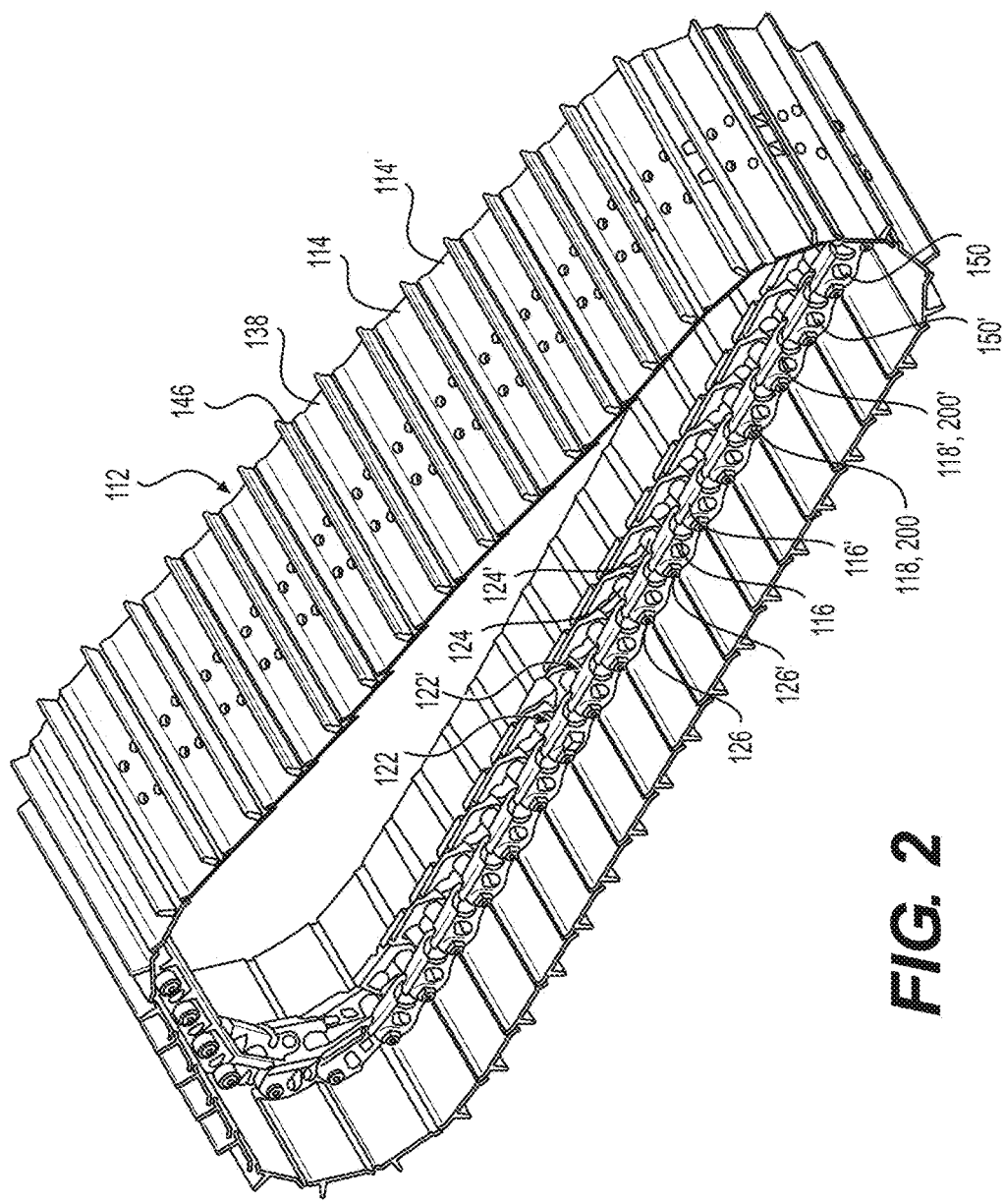
FIG. 2 is a perspective of a track chain assembly of the machine of FIG. 1 removed from the machine.
Figure 3:
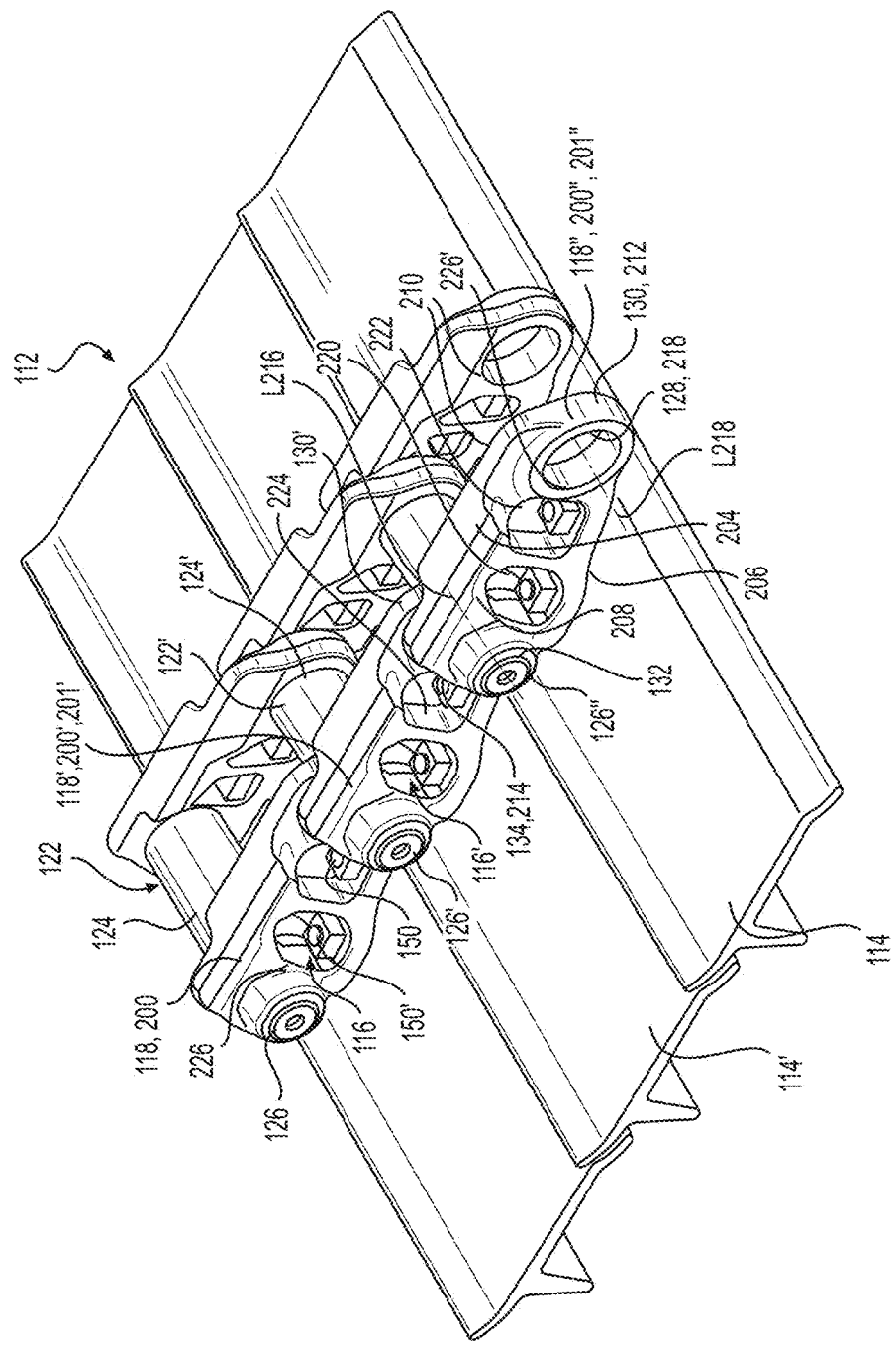
FIG. 3 is a perspective view of a few segments of the track chain assembly of FIG. 2.

FIGS. 2 and 3 respectively illustrate side-view and top-view perspectives of an exemplary chain assembly 112 and, specifically, a plurality of exemplary link subassemblies 116. Each one of link subassemblies 116 may include a respective pair of offset link members 118, 200 or a respective pair of inner and outer links when straight links are used (not shown). Hence, the term "link" may represent any configuration. Each offset link member 118, 200 may include fastener holes (not clearly shown), e.g., a threaded hole, configured to receive a fastener 150, e.g., a bolt, or cap screw, to attach a track shoe 114 to a given one of link subassemblies 116.

Adjacent ones of link subassemblies 116 may be interconnected by way of rod assemblies 122 in the form of pins or bushings. More specifically, each rod assembly 122 may include a substantially cylindrical bushing 124 disposed about a substantially cylindrical pin 126. A pair of bearings (not shown in FIGS. 2 and 3) that are freely rotatable relative to pin 126, and a pair of seals (not shown in FIGS. 2 and 3) may also be provided in the rod assembly or in one of the link members proximate the rod assembly to prevent the loss of lubrication and provide freedom of movement. In some embodiments, the bearings and seals may be combined functionally in the same assembly.

As best seen in FIG. 3, the bushing 124 may be pressed into an aperture 128 of one end 130 of the offset link member 118, 200 and the pin 126 may extend through this end 130 of the offset link member 118, 200 and be received in the aperture 132 of other end 134 of the adjacent offset link member 118'. The pin 126 may be retained in the other end 134 of the adjacent offset link member 118' by being pressed into that link member 118' or be retained therein using a cotter pin or another similar device when a slip fit is being used. Other configurations and methods of assembling the link subassemblies 116 may be provided to create a track chain assembly 112. Of course, a plurality of offset link members 118, 200 are connected in a manner similar to what has just been described to form the track chain assembly 112.

Figure 4:
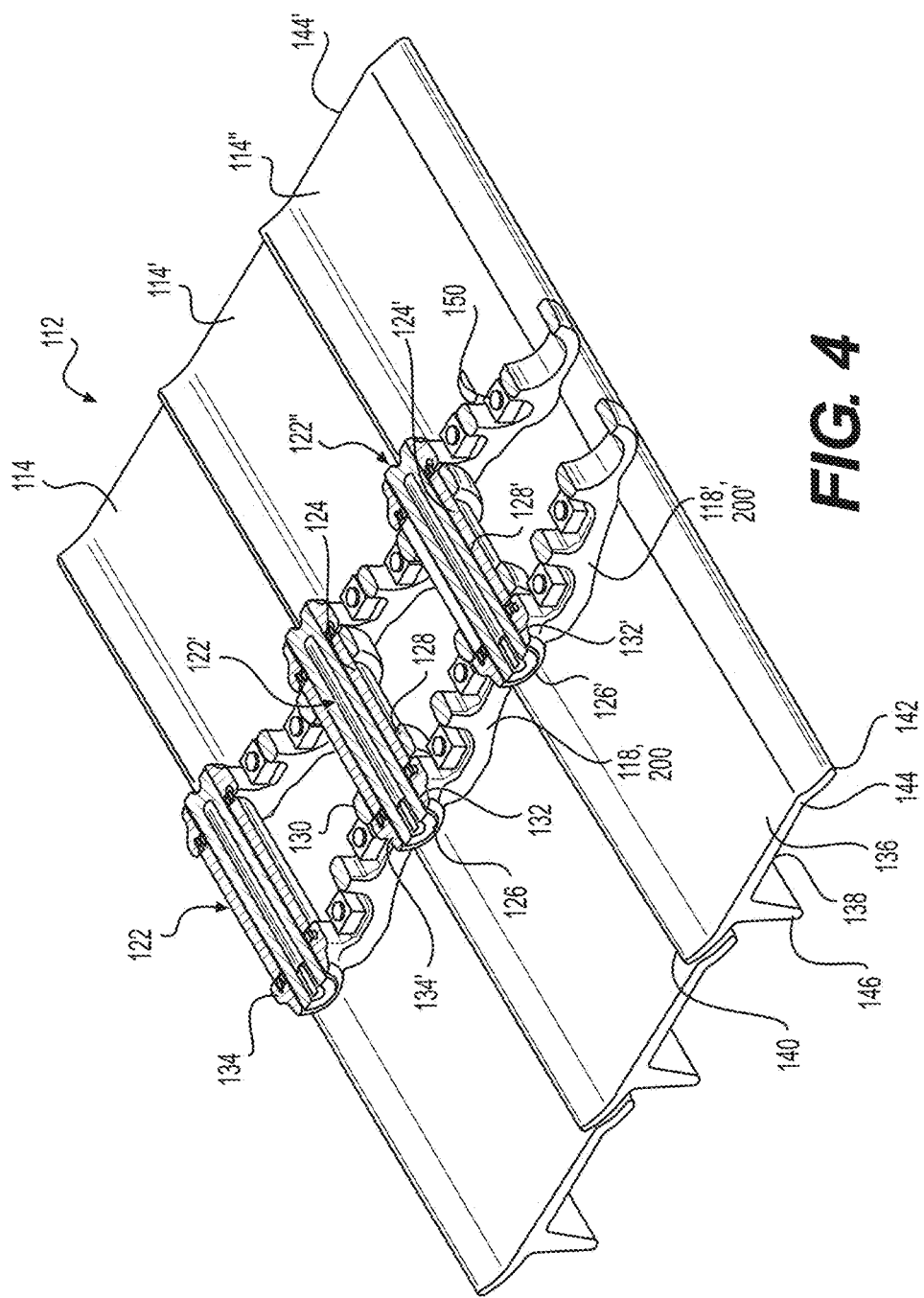
FIG. 4 is a sectional view of the segments of the track chain assembly of FIG. 3, revealing the seal counterbores and seal assemblies of the track chain assembly.
Figure 5:
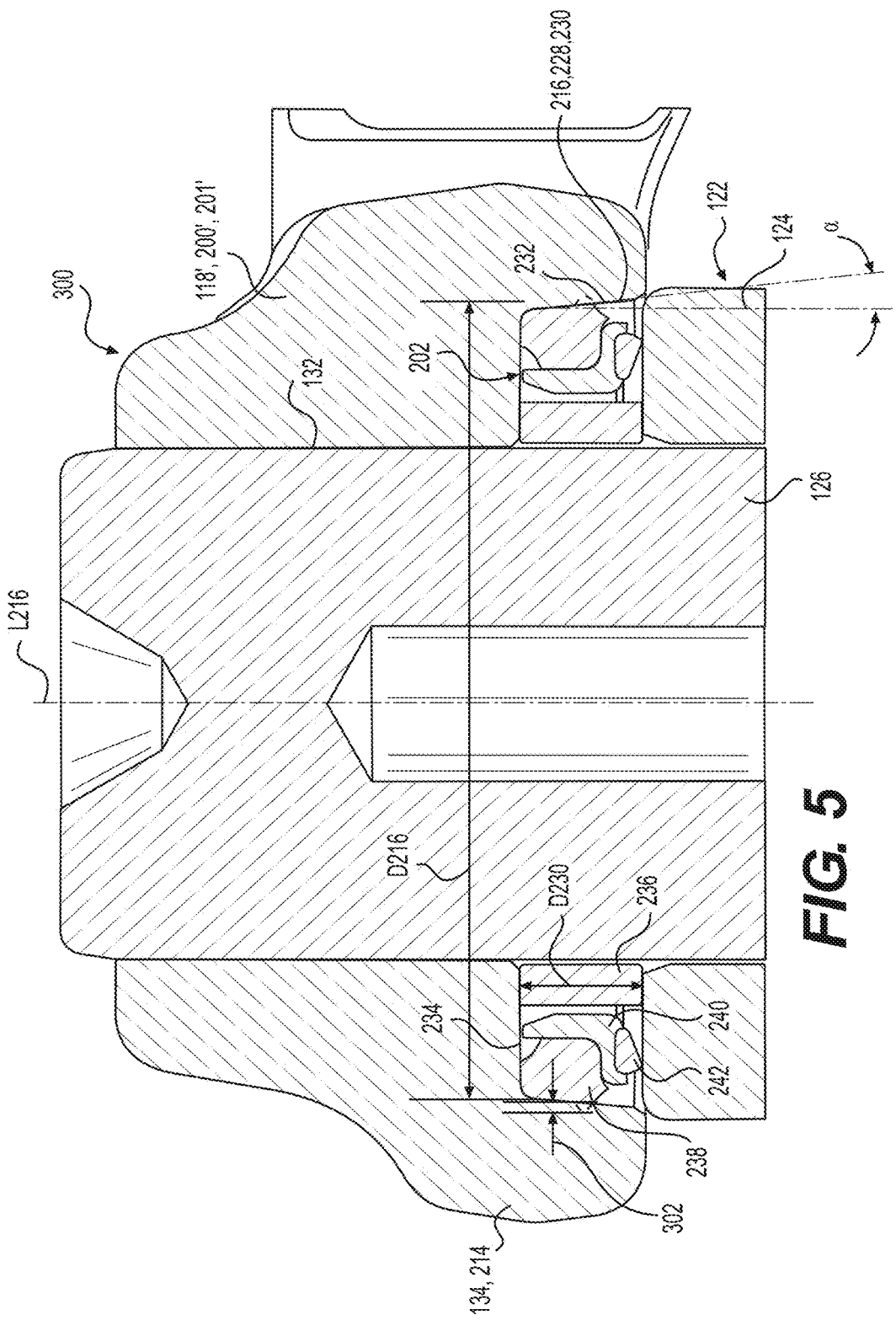
FIG. 5 is an enlarged top sectional view of an angled seal counterbore taken from FIG. 4.

More particularly as best seen in FIGS. 4 and 5, the first and second rod assemblies 122 may interface with apertures 128, 132 of adjacent offset link members 118, 118', 200, 200' such that consecutively connected link subassemblies 116 may be pivotally interconnected to one another to form the track chain assembly 112. For example, the outer end 134 of one offset link member 118', 200' may mate in fixed manner with the pin 126 (such as when a press fit is employed) and house the seals and/or bearings assemblies 202 while the inner end 130 of the adjacent offset link member 118, 200 may mate with the bushing 124 in a fixed manner (such as when a press fit if employed). At the same time, the pin 126 may be free to rotate within the bushing 124 such as when some clearance is provided between the pin and the bore of the bushing. Consequently, a pair of adjacent offset link members 118, 200 may be configured to pivot with respect to one another to form an articulating track chain assembly 112.

Focusing on FIG. 4, a track shoe 114 may be connected to each offset link member 118, 200. Each track shoe 114 may include a base portion 136, a ground-engaging surface 138, a leading edge 140, and a trailing edge 142. Each track shoe 114 may also include opposing side edges 144 disposed between leading edge 140 and trailing edge 142. One or more grousers or ribs 146 may be provided to engage the ground, improving traction. Additionally, each track shoe 114 may also include two pairs of threaded shoe holes (not shown), each pair disposed along a respective one of the side edges 144 and configured to align with a pair of fastener holes (not shown) associated with an offset link member 118, 200. In some embodiments, the holes in the track shoe may be clearance holes and not be threaded.

Typically, each one of shoe holes may correspond to an associated fastener receiving hole situated on the bottom surface of each of the offset link members 118, 200. As such, each track shoe 114 may respectively connect to a pair of opposing pair of offset link members 118, 200 from one side of the track chain assembly to the other side of the track chain assembly shown in FIG. 4. Threaded fasteners 150, such as, for example, bolts or cap screws, may be respectively disposed in each one of shoe holes and fastener receiving holes to fasten a track shoe 114 to a respective pair of opposing offset link members 118, 200. It is contemplated that the spacing of the fastener receiving holes 120 for each offset link member 118, 200 may be substantially similar such that each track shoe 114 may be configured to be connectable to each of offset link members, assuming that each track shoe is also similarly or identically configured.

Referring now to FIGS. 3 and 5, a track link 200 according to an embodiment of the present disclosure will be described in more detail. Such a track link 200 may comprise a body 201 defining a top surface 204, a bottom surface 206, a first side surface 208 and a second side surface 210 defining a thickness therebetween, a proximate end 212 and a distal end 214. The body 201 defines a first bore 216 adjacent the distal end 214 defining a first longitudinal axis L216 and a second bore 218 adjacent to the proximate end 212 defining a second longitudinal axis L218. The body 201 may also define a first aperture 220 disposed between the first bore 216 and the second bore 218, the first aperture 220 being disposed nearer the first bore 216 than the second bore 218.

Similarly, the body 201 may define a second aperture 222 disposed between the first aperture 220 and the second bore 218. It is contemplated that in certain embodiments one or no such apertures may be present between the first and second bores.

For this embodiment, the body 201 includes a first strut 224 disposed between the first aperture 220 and the second aperture 222. The strut 224 is shown to be undivided with no gap but it is contemplated that a gap could be provided such as when the link is a clamping master track link. Similarly, the bridge portion 226 located proximate the first and second bore 216, 218 may also be divided.

Looking at FIG. 5, either the first bore 216 or the second bore 218 may be a blind bore 228, forming a counterbore 230 configured to house a seal assembly 202 and the counterbore 230 may define a wall 232 that forms an angle α with the longitudinal axis L216, L218 of the bore that is greater than zero degrees but less than ten degrees. For the embodiment shown in FIG. 5, the first bore 216 is the blind bore 228.

In particular embodiments, this angle α ranges from three to seven degrees, and more particularly, may be approximately five degrees (e.g. within plus or minus half a degree of five degrees). The first and second bores 216, 218 have a cylindrical configuration but other configurations are possible. The first bore 216 is a blind bore 228 having a minimum diameter D216 ranging from 45 mm to 120 mm and a depth D230 measured along the first longitudinal axis L216 ranging from 8 mm to 12 mm. These dimensions may be varied as needed or desired.

Looking more closely at the counterbore 230, it is at least partially defined by two walls including a sidewall 232 and a bottom wall 234 and it is the sidewall 232 that is angled relative to the first longitudinal axis L216 of the first bore 216. Any wall forming the counterbore 230 including the bottom wall 234 and the sidewall 232 may have a surface finish such as 8-12 microns Ra. Likewise, any wall forming the counterbore 230 including the bottom wall 234 and the sidewall 232 may have a surface hardness that ranges from 25 to 55 Rockwell Scale C. The surface finish or surface hardness may vary as needed or desired.

For this embodiment, the body 201 jogs along either longitudinal axis L216, L218, forming an offset track link. Other configurations of the track link are possible including straight links, etc.

As shown in FIG. 5, the track link subassembly 300 includes link 200 further comprises a seal assembly 202 inserted into the counterbore 230. The seal assembly 202 may take the form of any seal assembly known or that will be devised in the art. For the seal assembly 202 shown in FIG. 5, the seal assembly 202 comprises a thrust ring 236, a flexible or resilient load ring 238, a rigid backup member 240, and a sealing member 242. The thrust ring 236 is in contact with the link 200 and the bushing 124, helping to prevent the seal assembly 202 from being crushed. The resilient load ring 238 is in compression, providing the desired sealing force on the rigid backup member 240 and the sealing member 242. The rigid backup member 240 helps to provide enough rigidity so enough sealing force is produced. The sealing member 242 is designed to prevent the loss of lubrication by impinging on the bushing 124 in a fluid tight manner.

To that end, the resilient load ring 238 is shown in FIG. 5 to be in contact with the bottom wall 234 and the sidewall 232, forming a radial interference 302 with the sidewall 232 that ranges from 0.2 to 1 mm. As shown in FIG. 5, the radial interference 302 is located at about one third to one half (more particularly about 45%) of the depth D230 along the longitudinal axis L216 on the sidewall measured from the opening of the bore 216. The positioning and amount of any interference may vary as needed or desired.

The arrangement and function of these various components of the seal assembly may be altered as needed or desired. For example, the load ring may not contact the walls of the counterbore but may be sandwiched between the sealing member and a more rigid member, etc.

INDUSTRIAL APPLICABILITY

In practice, a master track link, a standard link such as straight or offset link, or a track chain assembly using a link according to any embodiment described herein may be sold, bought, manufactured or otherwise obtained in an OEM or after-market context.

In some cases, the angled sidewall of the counterbore of the track link allows the seal assembly to be inserted therein with less risk of damaging or undesirably deforming the seal assembly. This may make the resulting chain assembly less prone to leaking lubricant in the field.

With reference to FIGS. 2 thru 5, in many embodiments, the track chain assembly 112 would comprise a plurality of track pins 126 and track bushings 124 disposed about the track pins 126, and a plurality of track links 118, 200 that are connected to each other by either a track pin 126 or a track bushing 124, wherein at least one track link 118, 200 defines a plurality of apertures 128, 130, 216, 218 for receiving a track pin 126 or bushing 124. Furthermore, a plurality of track fasteners 150 may be provided to attach a plurality of track shoes 114 attached to the track links 118, 200.

At least one track link 118, 200 would include a body 201 defining a top surface 204, a bottom surface 206, a first side surface 208 and a second side surface 210 defining a thickness therebetween, a proximate end 212 and a distal end 214. The body may define a first cylindrical bore 216 adjacent the distal end 214 and a second cylindrical bore 218 adjacent to the proximate end 212. Similarly, the body 201 may define a first aperture 220 disposed between the first bore 216 and the second bore 218, the first aperture 220 being disposed nearer the first bore 216 than the second bore 218. The body 201 would also likely define a second aperture 222 disposed between the first aperture 220 and the second bore 218.

As a result of these apertures 220, 222, the body 201 includes a first strut 224 disposed between the first aperture 220 and the second aperture 222. The first bore 216 defines a first longitudinal axis L216 and the second bore 218 defines a second longitudinal axis L218 and the body 201 jogs, forming an offset track link such that the first bore 216 and second bore 218 are offset from each other along either the first or second longitudinal axis L216, L218.

The first bore 216 defines a first diameter D216, the second bore 218 defines a second diameter D218, the first diameter D216 is greater than the second diameter D218, the first bore 216 is a blind bore 228 and the second bore 218 is a thru bore.

The first bore 216 forms a counterbore 230 configured to house a seal assembly 202 and the counterbore 230 defines a bottom wall 234 and a sidewall 232 that forms an angle α with the longitudinal axis L216 of the bore 216 that is greater than three degrees but less than seven degrees.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, it is intended that the specification and examples be considered as exemplary only, with a true scope and spirit of the invention(s) being indicated by the following claims and their equivalents.

What is claimed is:

1. A track chain assembly comprising:
    a plurality of track pins and track bushings disposed about the track pins; and
    a plurality of track links that are connected to each other by either a track pin or a track bushing, wherein at least one track link defines a plurality of apertures for receiving a track pin or bushing;
    a plurality of track fasteners;
    a plurality of track shoes attached to the track links via the track fasteners; and
    at least one track link including
        a body defining a top surface, a bottom surface, a first side surface and a second side surface defining a thickness therebetween, a proximate end and a distal end; wherein
        the body defines a first cylindrical bore adjacent the distal end and a second cylindrical bore adjacent to the proximate end;
        the body defines a first aperture disposed between the first bore and the second bore, the first aperture being disposed nearer the first bore than the second bore;
        the body defines a second aperture disposed between the first aperture and the second bore;
        the body includes a first strut disposed between the first aperture and the second aperture;
        the first bore defines a first longitudinal axis and the second bore defines a second longitudinal axis and the body jogs, forming an offset track link such that the first bore and second bore are offset from each other along either the first or second longitudinal axis;
        the first bore defines a first diameter, the second bore defines a second diameter, the first diameter is greater than the second diameter, the first bore is a blind bore and the second bore is a thru bore; and
        the first bore forms a counterbore configured to house a seal assembly and the counterbore defines a bottom wall and a sidewall that forms an angle with the longitudinal axis of the bore that is greater than three degrees but less than seven degrees.

2. The track chain assembly of claim 1 wherein the sidewall has a surface finish ranging from 8 to 12 microns Ra.

3. The track chain assembly of claim 2 wherein the sidewall has a surface hardness ranging from 25 Rockwell Scale C to 55 Rockwell Scale C.

4. The track chain assembly of claim 3 further comprising a plurality of similarly configured track links that define a counterbore with a sidewall that forms an angle with the longitudinal axis of the first bore that is greater than three degrees but less than seven degrees and a plurality of seal assemblies wherein one seal assembly is inserted into one counterbore of each of the plurality of track links, each seal assembly including a resilient load ring that is in contact with the bottom wall and the sidewall, forming a radial interference with the sidewall that ranges from 0.2 mm to 1 mm.

* * * * *